United States Patent
Singh

(10) Patent No.: US 12,191,042 B2
(45) Date of Patent: Jan. 7, 2025

(54) NUCLEAR FUEL DECAY HEAT UTILIZATION SYSTEM

(71) Applicant: HOLTEC INTERNATIONAL, Camden, NJ (US)

(72) Inventor: Krishna P. Singh, Jupiter, FL (US)

(73) Assignee: HOLTEC INTERNATIONAL

( * ) Notice: Subject to any disclaimer, the term of this patent is extended or adjusted under 35 U.S.C. 154(b) by 442 days.

(21) Appl. No.: 17/725,969

(22) Filed: Apr. 21, 2022

(65) Prior Publication Data
US 2023/0016181 A1    Jan. 19, 2023

Related U.S. Application Data

(60) Provisional application No. 63/178,000, filed on Apr. 22, 2021.

(51) Int. Cl.
| | |
|---|---|
| *G21C 19/40* | (2006.01) |
| *G21D 9/00* | (2006.01) |
| *F24V 99/00* | (2018.01) |
| *G21C 19/07* | (2006.01) |

(52) U.S. Cl.
CPC ............. *G21C 19/40* (2013.01); *G21D 9/00* (2013.01); *F24V 99/00* (2018.05); *G21C 19/07* (2013.01)

(58) Field of Classification Search
CPC .......... G21C 19/40; G21C 19/07; G21D 9/00; F24V 99/00
USPC .................................................. 376/272, 299
See application file for complete search history.

(56) References Cited

U.S. PATENT DOCUMENTS

| | | | |
|---|---|---|---|
| 3,996,749 A | 12/1976 | Denis et al. | |
| 4,006,857 A | 2/1977 | Adrian | |
| 4,755,352 A | 7/1988 | Glen et al. | |
| 5,268,942 A | 12/1993 | Newton et al. | |
| 5,488,642 A * | 1/1996 | Malik ................ | G21C 19/07 |
| | | | 376/272 |
| 6,183,243 B1 | 2/2001 | Snyder | |
| 7,245,688 B2 | 7/2007 | Nicholls et al. | |
| 8,300,759 B2 | 10/2012 | Jeong et al. | |
| 9,476,325 B2 | 10/2016 | Palanisamy | |
| 9,847,148 B2 | 12/2017 | Lloyd | |

(Continued)

OTHER PUBLICATIONS

International Search Report and the written Opinion of PCT/US2022/25762 Issued Aug. 3, 2022.

*Primary Examiner* — Jack W Keith
*Assistant Examiner* — Daniel Wasil
(74) *Attorney, Agent, or Firm* — The Belles Group, P.C.

(57) ABSTRACT

A system uses nuclear fuel decay heat to heat a building. The system includes a plurality of fluidly-isolated but thermally-coupled heat removal flow loops that operate in tandem to absorb thermal energy originating from water in a spent nuclear fuel pool located in the building. The thermal energy is transferred in a cascading manner from a first flow loop to a final flow loop which has an external heat sink located outside the building. The heat sink can transfer heat to an ambient environment. A controller regulates the intake and flowrate of cooling water into the final flow loop. The controller also monitors fuel pool water temperature and air temperature inside the building. The controller can regulate the flowrate to maintain a predetermined building air temperature by allowing the fuel pool water temperature to rise to near a maximum permissible limit.

20 Claims, 5 Drawing Sheets

(56) References Cited

U.S. PATENT DOCUMENTS

| | | |
|---|---|---|
| 10,672,523 B2 | 6/2020 | Singh et al. |
| 2004/0240601 A1 | 12/2004 | Tian |
| 2010/0154406 A1 | 6/2010 | Conard et al. |
| 2011/0283701 A1 | 11/2011 | Eftekharzadeh |
| 2012/0294407 A1 | 11/2012 | Namba et al. |
| 2012/0294737 A1* | 11/2012 | Singh .................... G21C 19/08 165/104.21 |
| 2013/0028365 A1 | 1/2013 | Tatli et al. |
| 2013/0108004 A1 | 5/2013 | Lee et al. |
| 2013/0308738 A1 | 11/2013 | Ayer et al. |
| 2019/0206580 A1 | 7/2019 | Walters |
| 2020/0335233 A1* | 10/2020 | Conway ................ G21C 19/07 |

* cited by examiner

NUCLEAR FUEL DECAY HEAT UTILIZATION SYSTEM

CROSS-REFERENCE TO RELATED APPLICATIONS

The present application claims the benefit of priority to U.S. Provisional Application No. 63/178,000 filed Apr. 22, 2021, which is incorporated herein by reference in its entirety.

BACKGROUND

The present disclosure is related to nuclear generation facilities, and more particularly to a system configured to harness the wasted thermal energy from decay heat produced by spent nuclear fuel (SNF) stored in the fuel pool for uses such as space heating and others.

Every nuclear power plant stores the irradiated fuel discharged from the reactor (i.e. spent nuclear fuel or SNF) in its Fuel Pool for a certain length of time to allow its heat generation rate to attenuate sufficiently before transferring it to dry storage. A typical Fuel Pool contains enough fuel to produce between 5 to 40 million BTUs per hour (BTUH) of decay heat which must be continuously expelled from the plant to prevent overheating of the water in the pool. The nuclear plant is equipped with a set of heat removal systems which collectively and ultimately reject the used or spent fuel's decay heat emitted by the fuel assemblies submerged in the fuel pool to a heat sink. This heat sink may be an environmental heat sink such a natural body of water (e.g., a lake, river, or the sea).

Pumped and filtered raw water extracted from the heat sink is circulated through the plant heat removal systems to cool the fuel pool water heated by the array of spent fuel assemblies therein. The now heated raw water is then returned to the environmental heat sink. Thus, ultimately the decay heat from the spent fuel ends up in the environment adding to the thermal pollution burden of the plant's heat sink. The fuel's decay heat manifests in heating the local body of water thereby potentially adversely affecting aquatic or marine life. In a plant undergoing decommissioning, a perverse situation develops wherein the plant uses fuel oil to heat its internal reactor building space in the winter months while its own native waste heat is released to the environment and squandered.

Improvements in reducing thermal water pollution attributable to nuclear fuel decay heat as the source and reclaiming the wasted heat for space heating in a nuclear plant while maintaining plant safety metrics are desired.

BRIEF SUMMARY

The present disclosure provides an electronic processor-based nuclear fuel decay heat utilization system for a nuclear generation plant which harnesses the otherwise wasted thermal energy from this heat source. In one embodiment, the thermal energy captured from the spent nuclear fuel (SNF) which heats the fuel pool may be used space heating a building. The building may be a reactor building at the nuclear generation plant which houses a nuclear reactor, spent fuel pool containing pool water which is heated by the decay heat emitted from submerged spent fuel assemblies housed in fuel racks disposed therein. Other auxiliary equipment may be housed in the reactor building such as for example without limitation in certain embodiments various plant heat removal systems, steam generator, water treatment equipment such as a demineralizer, and other auxiliary equipment typically employed in the production of electric power in a nuclear generation plant. In some installations, the balance of the Rankine steam-to-electric cycle equipment besides the steam generator such as the turbine-generator which converts steam energy to electric energy, condenser, and feedwater heaters (e.g., low pressure heaters, high pressure heaters, and deaerators) of the condensate and feedwater systems may be housed in a physically separate building or portion of a single structure having an interior space which is segregated from the interior space of the reactor building for space heating purposes.

The nuclear fuel decay heat utilization system comprises a plurality of plant heat removal system whose operation is controlled by a programmable controller including one or more processors operably coupled to a plurality of temperature sensors. The temperature sensors are configured and arranged to monitor air temperature in the reactor building and the water temperature at various points in the plant heat removal systems located therein. In one embodiment, based on sensor input, the controller is configured and operable to throttle the intake of a primary liquid cooling medium extracted by the heat removal systems from an external heat sink located outside the building. The "primary" cooling medium is the lowest temperature heat transfer fluid circulated through the heat removal systems which ultimately rejects the nuclear fuel decay heat from the fuel pool to the environment. The primary cooling medium comprises cooling water received from the external heat sink, which is generally referred to as "raw water" in the art. The heat removal system which conveys cold raw water to the plant from and returns heated raw water to the heat sink is referred to as a "raw water system" in the art.

The plant heat removal systems in one embodiment includes: a fuel pool cooling system comprising a pumped closed flow loop through which pool water circulates; the raw water system noted above comprising a pumped open or closed flow loop which circulates the raw water, and an intermediary cooling system comprising a pumped closed flow loop through which an intermediary liquid cooling medium is pumped. The intermediary closed flow loop is thermally coupled to and between the foregoing fuel pool and raw water flow loops through heat exchangers. In operation, the fuel pool cooling system is cooled by the intermediary cooling system, which in turn is cooled by the raw water flowing through the raw water system which is fluidly coupled to the external heat sink located outside the reactor building. During the process, the intermediary cooling system initially absorbs the decay heat from the fuel pool cooling system and transfers that thermal energy to the raw water system which expels the heat to the environment via the heat sink. The external heat sink may be an environmental heat sink such a natural body of water (e.g., a lake, river, or the sea), or a mechanical heat sink which is a heat exchanger such as a natural or mechanical draft cooling tower or air-cooled condenser.

The fuel pool cooling system and intermediary cooling system are located inside the reactor building. A portion of the primary cooling system flow loop which thermally interfaces with the intermediary cooling system flow loop via a heat exchanger is located inside the building. The other portion is located outside the building which operably interfaces with the external heat sink.

In some embodiments, the intermediary cooling system may be a component cooling water (CCW) system including a labyrinth of piping (piping network) located throughout the reactor building which circulates the CCW to cool various plant systems and components requiring cooling. Such systems are generally known in the art.

Typically, in a typical nuclear generation plant, the flowrate of raw water (i.e. primary liquid cooling medium at the lowest temperature of the heat removal systems) which is extracted from the external heat sink runs fully open to cool the component cooling water system components and concomitantly the fuel pool in the reactor building to the greatest degree possible. This is standard operating procedure even during winter months. Accordingly, the decay heat extracted from the fuel pool is ultimately rejected to the external heat sink and ambient environment outside the reactor building. As discussed in the background above, a separate fuel source such as fuel oil or natural gas is used to heat the reactor building during the winter, thereby wasting the available thermal energy of the SNF decay heat from the fuel pool and thermally polluting the environment.

In the present decay heat utilization system, as noted above, the programmable controller throttles back or may completely stop the intake of raw water (primary liquid coolant) the plant to maintain the temperature of the pool water in the fuel pool at an elevated temperature just below the maximum allowable temperature limit permitted by governmental nuclear regulatory bodies such as the United States Nuclear Regulatory Commission (USNRC). This operational mode results in elevating or increasing the temperature of the intermediary liquid coolant circulating through the intermediary cooling system such as the CCW system. The elevated water temperatures circulating through closed flow loop fuel pool and intermediate cooling systems are therefore advantageously able to radiate this thermal energy or heat through exposed bare pipe sections of their piping networks within the reactor building for space heating purposes. This eliminates or at the very least minimizes the need for supplementary fossil fuels such as oil or natural gas for reactor building space heating purposes during the winter. The nuclear fuel decay heat utilization system disclosed herein thereby advantageously decreases thermal pollution of the environment and reduces carbon emissions by negating or minimizing the need to use fossil fuels for space heating.

In other operational aspects of the decay heat utilization system, the system may be used to evaporate the inventory of spent fuel pool water during decommissioning of a nuclear power generation plant by throttling the raw water flow into the system from the external heat sink, as further described herein.

In one aspect, a nuclear fuel decay heat utilization system for space heating a building comprises: a fuel pool disposed in the building, the fuel pool containing pool water and a plurality of nuclear fuel assemblies submerged in the pool water which emit decay heat that heats the pool water; a first cooling system disposed in the building and comprising a first closed flow loop fluidly coupled to the fuel pool, the first cooling system configured to circulate the pool water through the first closed flow loop and a first heat exchanger fluidly disposed in the first closed flow loop; a second cooling system disposed in the building and comprising a second closed flow loop thermally coupled to the first closed flow loop through the first heat exchanger, the fuel second cooling system configured to circulate cooling water through the second closed flow loop and a second heat exchanger fluidly disposed in the second closed flow loop, and also circulate the cooling water through the first heat exchanger in which the cooling water absorbs heat from the heated pool water which cools the heated pool water and heats the cooling water; a third cooling system comprising an external heat sink located outside the building and a third flow loop thermally coupled to the second closed flow loop through the second heat exchanger, the third cooling system configured to circulate raw water from the heat sink through the second heat exchanger in which the raw water absorbs heat from the cooling water in the second closed flow loop which cools the cooling water and heats the raw water; the third cooling system further configured to circulate the heated raw water back to the external heat sink which rejects heat absorbed from the cooling water to the external heat sink; an air temperature sensor disposed in the building and configured to measure a real-time air temperature inside the building; a throttle valve fluidly interposed between the external heat sink and the second heat exchanger in the third flow loop, the throttle valve configured to regulate a flowrate of the raw circulated through third flow loop from the heat sink and the second heat exchanger; a programmable controller operably coupled to the throttle valve and the air temperature sensor, the controller configured to: monitor the real-time air temperature inside the building; compare the real-time air temperature to a preprogrammed building setpoint air temperature; and control the flowrate of the raw water to maintain the building setpoint air temperature.

The first and second closed flow loops each comprise a piping network extending throughout the building; the piping networks including at least some bare piping sections operable to radiate heat from the heated pool water and cooling water flowing in the first and second closed flow loops respectively which heats ambient air inside the building. Portions of the bare piping sections in the first and second closed flow loops may comprise external fins configured to radiate heat to the ambient air inside the building for space heating via creating extended surface area of the bare piping section to radiate a greater amount of heat.

The system may further comprise a fuel pool temperature sensor operably coupled to the controller and configured to measure a real-time pool water temperature, the controller configured to regulate the flowrate of raw water in the third flow loop via throttling the throttle valve when the pool water temperature to keep the pool water temperature below a preprogrammed maximum pool water setpoint temperature. The maximum pool water setpoint temperature may be 150 degrees F. (Fahrenheit). The controller may be configured via programming to prioritize maintaining the fuel pool temperature below the maximum pool water setpoint temperature over maintaining the building setpoint air temperature to ensure plant operational safety.

A maximum temperature of the pool water circulating through the first closed flow loop is higher than a maximum temperature of the cooling water circulating through the second closed flow loop, and the maximum temperature of the cooling water circulating through the second closed flow loop is higher than a maximum temperature of the raw water circulating through the third flow loop.

In another aspect, a method for space heating a building using nuclear fuel decay heat comprises: submerging a plurality of fuel assemblies containing nuclear fuel in a fuel pool containing pool water; heating the fuel pool with heat emitted from the fuel assemblies which heats the pool water; circulating the heated pool water through a first closed flow loop; transferring heat from the heated pool water to a second closed flow loop which heats cooling water circulating therein; and radiating heat from the second closed flow loop to an interior space of the building. The heat is radiated to the interior space of the building from bare piping sections of the second closed flow loop.

In yet another aspect, a method of using nuclear fuel decay heat for space heating comprises: providing a nuclear generation plant comprising a building including a fuel pool containing a plurality of submerged fuel assemblies which emit decay heat that heats pool water in the fuel pool; providing a decay heat utilization system which draws raw water from an external heat sink colder than the heated pool water; the raw water receiving decay heat from the pool water through an intermediary cooling water system circulating cooling water which absorbs the decay heat from the pool water to produce heated cooling water; the cooling water transferring the decay heat to the raw water which in turn transfers the heat to the external heat sink; and heating an interior space of the building by radiating heat from the heated cooling water into an interior space of the building to heat the interior space. The heating step includes radiating the heat from the heated cooling water through bare sections of a piping network of the intermediary cooling water system.

In the foregoing method, a control system may be provided including a programmable controller configured to implement a first sub-routine comprising steps including: measuring a real-time air temperature inside the building via an air temperature sensor operably coupled to the controller; comparing the real-time air temperature to a preprogrammed building setpoint air temperature; and regulating a flowrate of raw water drawn into the decay heat utilization system to maintain the building setpoint air temperature. The controller throttles the flowrate of raw water through a throttle valve to regulate the flowrate of raw water drawn into the decay heat utilization system.

The controller may be further configured to implement a second sub-routine comprising steps including: measuring the fuel pool water temperature via a water temperature sensor operably coupled to the controller; comparing the pool water temperature to a preprogrammed maximum pool water setpoint temperature; determining if the pool water temperature is below a maximum pool water setpoint temperature; overriding the first sub-routine if the pool water temperature is not below the maximum pool water setpoint temperature; and controlling a flowrate of raw water to maintain pool water temperature below the maximum pool water setpoint temperature.

BRIEF DESCRIPTION OF THE DRAWINGS

The present invention will become more fully understood from the detailed description and the accompanying drawings, wherein like elements are labeled similarly and in which.

Figure 1:
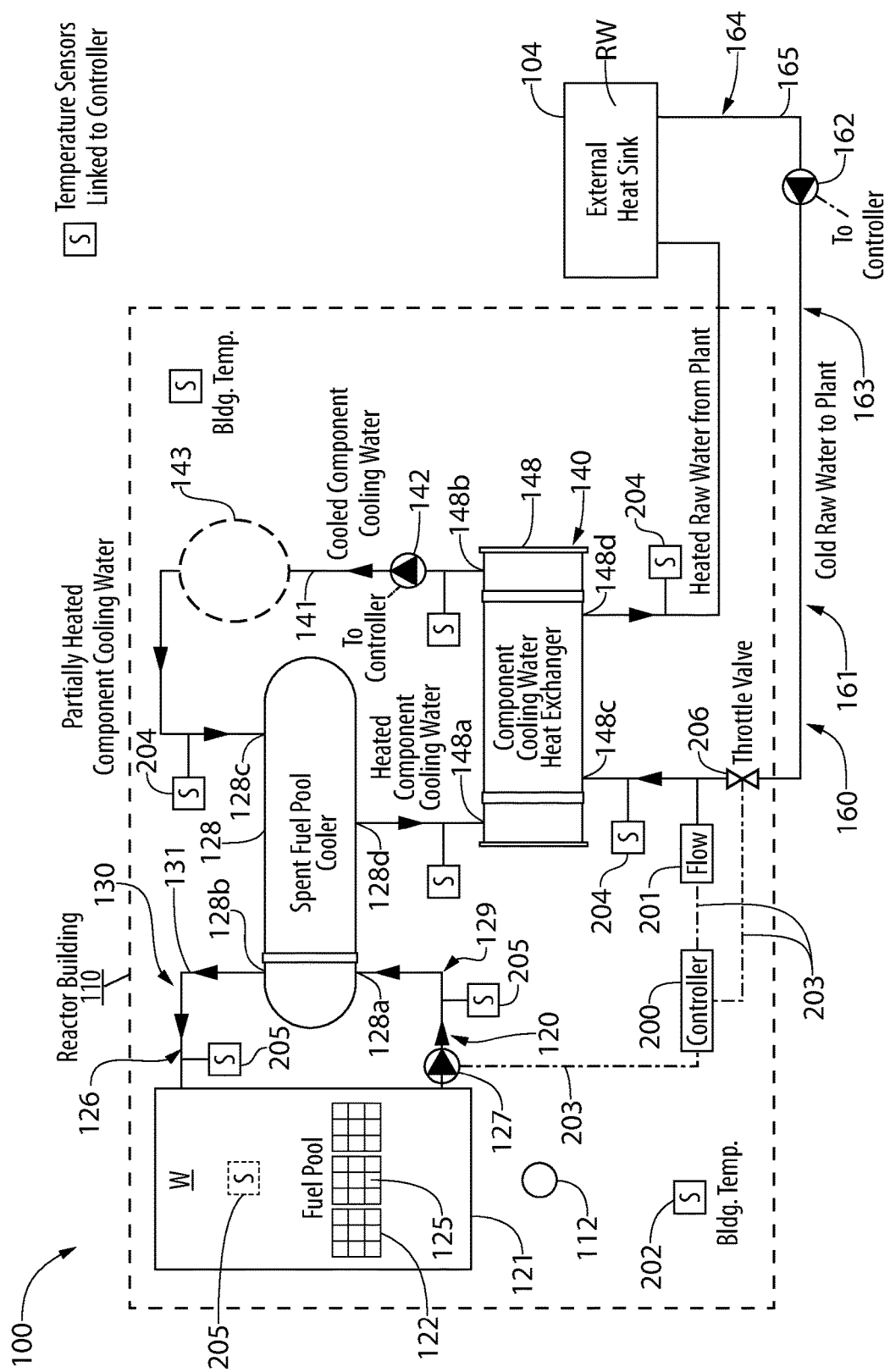
FIG. 1 is a schematic flow diagram of a nuclear fuel decay heat utilization heating system according to the present disclosure.

All drawings are schematic and not necessarily to scale. Features or items shown numbered in certain figures which may appear un-numbered in other figures are the same features or items unless noted otherwise herein.

DETAILED DESCRIPTION

The features and benefits of the invention are illustrated and described herein by reference to non-limiting examples in which aspects of the disclosure may be embodied. This description of examples is intended to be read in connection with the accompanying drawings or photos, which are to be considered part of the entire written description. Accordingly, the disclosure expressly should not be limited to such examples illustrating some possible non-limiting combination of features that may exist alone or in other combinations of features disclosed herein.

In the description of examples disclosed herein, any reference to direction or orientation is merely intended for convenience of description and is not intended in any way to limit the scope of the present invention. Relative terms such as "lower," "upper," "horizontal," "vertical,", "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise.

As used throughout, any ranges disclosed herein are used as shorthand for describing each and every value that is within the range. Any value within the range can be selected as the terminus of the range.

FIG. 1 is a schematic flow diagram of a nuclear fuel decay heat utilization system 100 according to the present disclosure used for space heating. The system includes reactor building 110 defining an interior space 111 which contains the reactor 112 (represented schematically) and spent nuclear fuel (SNF) pool 121 also referenced to herein as a "fuel pool" for brevity. The fuel pool is filled to a surface level S with pool water W. With additional reference to FIG. 2, typical fuel pools 121 may have a total depth D1 of approximately 40 feet as a non-limiting example.

Figure 2:
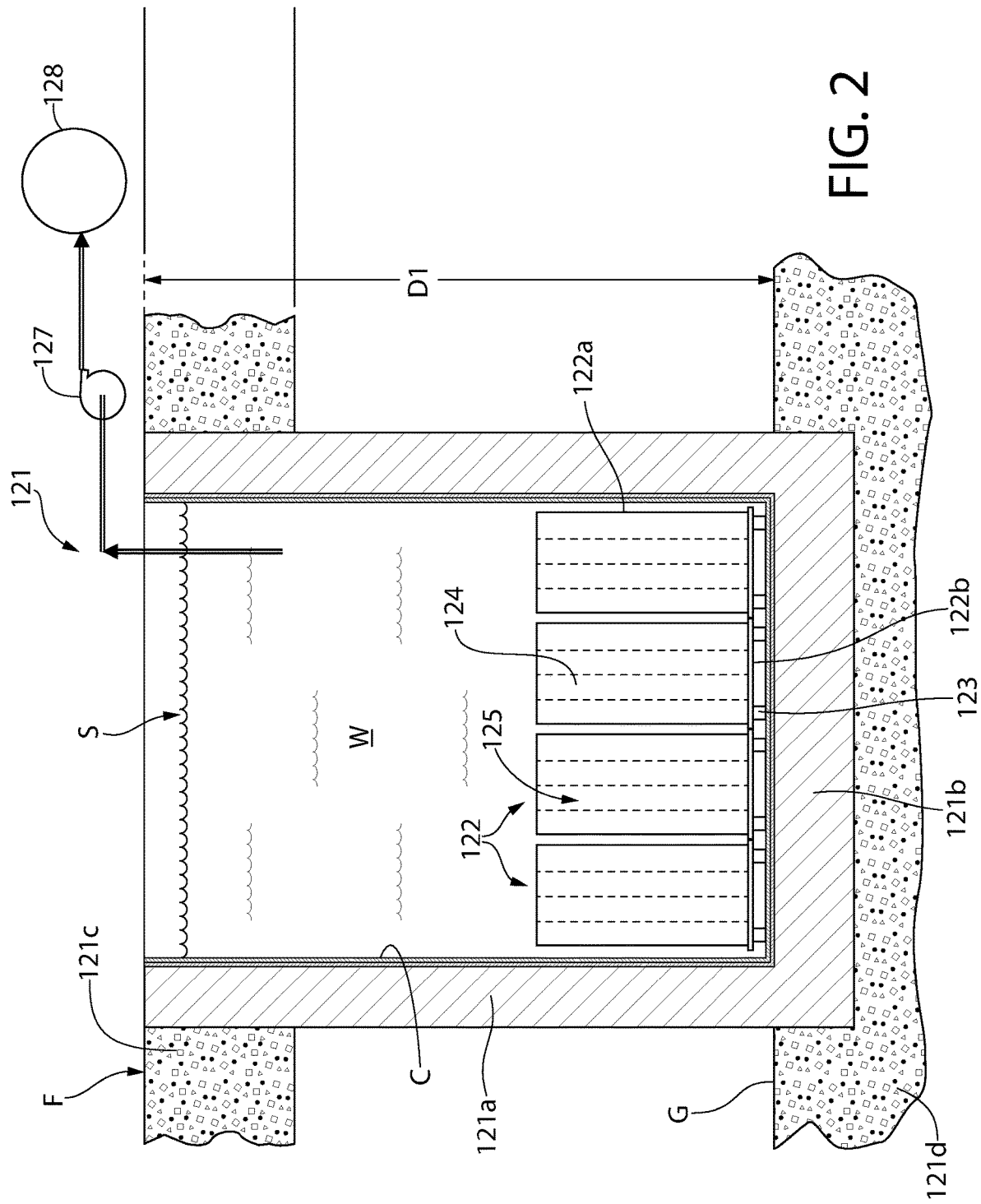
FIG. 2 is a side cross sectional view of the nuclear fuel pool and fuel racks shown in FIG. 1.

Referring to FIGS. 1 and 2, fuel pool 121 includes a plurality of vertical walls 121a rising upwards from a horizontal flat floor slab 121b; all of which may be formed of thick reinforced concrete constructed to form a watertight basin for containing the pool water. The walls and floor define an upwardly open recess or cavity C containing the pool water W. A thick concrete top pad 121c defining an operating floor F surrounds the fuel pool and can support the weight of equipment used to access the pool for loading and unloading fuel assemblies 124 from fuel racks 122 submerged in the pool water W which cools the fuel assembly and provides radiation shielding. The floor slab 121b may be embedded in engineered fill 121d. The foregoing aspects of spent nuclear fuel pools are well known in the art without further undue elaboration necessary.

Figure 4:
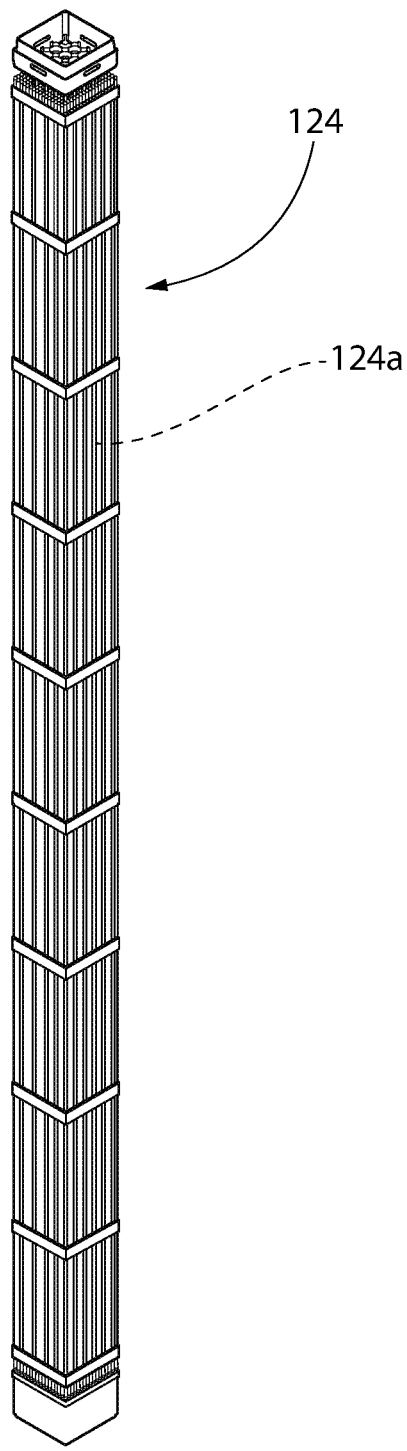
FIG. 4 is a perspective view of a rectangular nuclear fuel assembly of the type which may be stored in the fuel racks.

With continuing reference to FIGS. 1 and 2, the pool water W in fuel pool 121 is heated by decay heat emitted from a plurality of fuel assemblies 124 stored in the upwardly open cells 125 of a plurality of fuel racks 122 seated on the floor slab 121b of the fuel pool. Fuel racks have a prismatic structure including a baseplate 122b and plurality of vertically-elongated wall structures 122a such as tubes or interconnected plates that define the open cells 125 which receive the fuel assemblies. Baseplate 122b and wall structures 122a may be formed of stainless steel in one embodiment for corrosion resistance. The cells 125 may have any suitable cross-sectional shape to accommodate the fuel assemblies which contain the spent nuclear fuel rods. In one embodiment, the open cells may have a rectilinear cross-sectional shape for inserting fuel assemblies 124 therein having a corresponding rectilinear cross-sectional shape typical of those assemblies used in the United States (see also FIG. 4). Each fuel assembly 124 contains a nuclear fuel 124a comprising a multitude of nuclear fuel rods or "cladding" each containing uranium pellets. In other embodiments, the cells 125 may have a hexagonal cross-sectional which correspond to those fuel assemblies containing nuclear fuel rods used outside the United States such as in Russia and elsewhere. The shape of the cells of course does not limit the present invention in any respect.

Each fuel rack 122 may include a plurality of pedestals 122b extending downwards from the horizontal baseplate 122b of the fuel racks to engage the fuel pool floor slab 121b. This elevates the fuel racks above the floor slab 121b of fuel pool 121 which allows the pool water W to circulate beneath the fuel racks to cool the fuel assemblies stored therein. The foregoing aspects of fuel racks and fuel assemblies are well known in the art without further undue elaboration necessary.

Decay heat utilization system 100 further includes plurality of water bearing plant heat removal systems including without limitation a fuel pool cooling system 120, raw water cooling system 160, and an intermediary component cooling water (CCW) system 140 thermally coupled therebetween but fluidly isolated from the systems 120 and 160, as further described herein.

The raw water cooling system 160 comprises a flow loop 161 including raw water pump 162 which pumps raw water through the flow loop, and an external heat sink 104 located outside the reactor building 110. Heat sink 104 serves as the final repository for rejecting the waste decay heat emitted by the nuclear fuel assemblies 124 submerged in fuel pool 121 via the intermediary CCW system 140. The water circulating through the raw water cooling system 160 in flow loop 161 drawn from external heat sink 104 is referred to as "raw water" in the art which is filtered for use in the nuclear plant heat removal systems, as further described herein.

In certain embodiments, the external heat sink 104 may be a natural (i.e. environmental) heat sink comprising a body of water such as without limitation a lake, river, or the sea as some examples, or a man-made body of water such as a cooling pond. The nuclear fuel decay heat is rejected to the environment by heating the water flowing through the intermediary CCW system which in turn rejects its thermal energy to heat the raw water extracted from the heat sink 104. The heated raw water is returned to the heat sink 104 which rejects it thermal energy to the heat sink water via mixing and/or evaporation to the ambient environment. In the case of a natural heat sink, the flow of raw water pumped through the nuclear plant is a once-through flow system. In this instance, the raw water flow loop 161 may be considered an "open" flow loop in the art since the raw water is not recirculated through the heat sink and returned to the plant in the flow loop for multiple heating and cooling cycles.

In embodiments where an available natural body of water or one of insufficient volume to satisfy the raw water cooling requirement for the nuclear plant is not available, a man-made external heat sink 104 may be used such as a cooling, or alternatively mechanical water-to-air heat exchangers including without limitation natural draft or mechanical draft cooling towers, or an air-cooled condenser. The cooling pond functions similarly as a lake to reject decay heat from the fuel assemblies in the fuel pool by heating the raw water impounded in the cooling pond. By contrast however, the cooling pond is typically a captive body of water not fed by an inlet stream and having no outlet stream. Raw water flow loop 161 may therefore be considered a "closed" flow loop in this case as the cooling pond water is recirculating through the raw water cooling system.

The foregoing mechanical heat sinks are commercially-available and well known in the art without undue elaboration. The cooling pond functions the same as a lake to reject heat to the environment by heating the water impounded in the cooling pond which evaporates. In the case of the foregoing mechanical heat sink (heat exchanger) devices, the raw water is recirculated therethrough in flow loop 161 and rejects it thermal energy to ambient air in the mechanism heat sink devices which cools the raw water. The cooled raw water is pumped back to the nuclear plant to again become heated as it absorbs thermal energy from the CCW closed flow loop 141 and the process is repeated. Raw water flow loop 161 in this case may therefore be considered a "closed" flow loop since the raw water is recirculated and reused thereby undergoing multiple heating and cooling cycles.

The raw water flow loop 161 is comprised of a piping network 163 having an inside portion extending through the interior space 111 of reactor building 110 and fluidly coupled to CCW heat exchanger 148. Piping network 163 further comprises an outside portion external to blade 110 which is fluidly coupled to external heat sink 104. The raw water flow loop 161 and its piping network 163 may have any suitable configuration designed to, in fluidic order, extract and pump cool raw water from heat sink 104 to CCW heat exchanger 148, circulate the raw water through pump the heat exchanger 128 where it absorbs heat (thermal energy) from the CCW closed flow loop 141 to cool the CCW, and return the heated raw water to the heat sink. The raw water piping network 163 is comprised of metallic piping 164 which includes bare piping sections 165. In one embodiment, the bare piping sections 165 may be in the outlet leg of the raw water piping 164 which is located inside the building 110 to radiate heat from the heated raw water leaving CCW heat exchanger 148 to the interior space 111 for space heating purposes.

With continuing reference to FIG. 1, the shell and tube CCW heat exchanger 148 includes a CCW inlet 148a which receives heated pool water W from fuel pool heat exchanger 128 via CCW closed flow loop 141, CCW outlet 148b which discharges cooled CCW back to the closed flow loop 141, raw water inlet 148c which receives cold raw water from external heat sink 104 via raw water flow loop 161, and raw water outlet 148d which discharges heated raw water CCW back to flow loop 161 for return to the external heat sink 104.

With reference to FIGS. 1 and 2, the fuel pool cooling system 120 includes closed flow loop 126 which comprises in fluid communication the fuel pool 121, fuel pool circulation pump 126, and fuel pool cooler or heat exchanger 128. Each of the foregoing components are integral fluidic parts of the closed flow loop 126. Pump 126 circulates pool water W extracted on its suction side from fuel pool 121 through the closed flow loop 126 to the heat exchanger 128 and then back to the fuel pool in a continuous recirculation flow circuit or loop.

The fuel pool closed flow loop 126 is fluidly isolated from the CCW closed flow loop 141 and raw water flow loop 161. It bears noting that even though the pool water and CCW closed flow loops 126, 141 are "thermally coupled" together in the fuel pool heat exchanger 128, these flow loops remain fluidly isolated such that there is no exchange of water therebetween. The term "thermally coupled" is used herein to connote that there is an exchange of heat (i.e. thermal energy) between the flow loops in the heat exchanger which may be of the shell and tube design. In such heat exchanger designs commonly known in the art, one fluid such as pool water W flows either on the shell-side of the heat exchanger inside the shell but external to the tubes, while the other fluid such as CCW flows on the tube-side inside the tubes, or vice-versa. Accordingly, there is no mixing of the fluids which remain fluidly isolated within their respective flow loops.

With continuing reference to FIG. 1, the shell and tube fuel pool heat exchanger 128 includes a pool water inlet 128a which receives heated pool water W from the fuel pool 121 via closed flow loop 126, pool water outlet 128b which discharges cooled pool water back to the closed flow loop 126 and fuel pool, CCW inlet 128c which receives heated CCW from the multitude of CCW components 143 via CCW closed flow loop 141, and CCW outlet 128d which discharges cooled CCW back to flow loop 141 for recirculation back through the CCW components in the plant.

Closed flow loop 126 is comprised of a piping network 129 extending through the interior space 111 of a portion of the reactor building 110 and includes the fuel pool 121. The closed flow loop 126 and its piping network 129 may have any suitable configuration designed to, in fluidic order, extract the hot or heated pool water W from the fuel pool 121, circulate the heated pool water to and through fuel pool water pump 127 and then to heat exchanger 128, and return the cooled pool water to the fuel pool (see, e.g., FIG. 1). Heated pool water W pumped by pump 127 enters fuel pool heat exchanger 128, is cooled by CCW circulating in the second closed flow loop 141 (further described below), and leaves the heat exchanger 128 in a cooled state for return to the fuel pool. This cools and maintains the pool water in fuel pool 121 at a temperature below the regulatory maximum allowable temperature.

The fuel pool cooling piping network 129 of closed flow loop 126 is comprised of metallic piping 130 which includes bare piping sections 131 configured to radiate heat from the heated pool water W to the interior space 111 of reactor building 110 for space heating purposes. In some embodiments, all of the piping network 129 may be comprised of bare piping sections 131 (i.e. no piping insulation) to maximize space heating and in turn concomitantly cool the pool water to protect the nuclear fuel assemblies submerged therein.

With continuing reference thereof FIGS. 1 and 2, the CCW system 140 includes closed flow loop 141 which comprises in fluid communication the CCW pump 142, CCW heat exchanger 148, fuel pool heat exchanger 128, and a plurality of auxiliary fluidic components 143 cooled by the CCW which are represented collectively in FIG. 1 within the dashed circle. Each of the foregoing components are integral fluidic parts of the closed flow loop 141. Pump 142 circulates CCW through the closed flow loop 126 to fuel pool heat exchanger 128 and CCW heat exchanger 148 in a continuous recirculation flow circuit or loop.

The CCW closed flow loop 141 is fluidly isolated from the fuel pool closed flow loop 126 and raw water flow loop 161. It bears noting that even though the pool water and CCW closed flow loops 126, 141 are "thermally coupled" together in the fuel pool heat exchanger 128, and the CCW closed flow loop 141 and raw water flow loop 161 are thermally coupled together in the CCW heat exchanger 148, all of these flow loops remain fluidly isolated such that there is no exchange of water therebetween. CCW heat exchanger 148 may be therefore be a shell and tube heat exchanger design similarly to fuel pool heat exchanger 128 previously described herein to keep the CCW and raw water flow loops fluidly isolated from each other.

CCW closed flow loop 141 is comprised of a piping network 144 forming a labyrinth of fluidly interconnected piping branches extending throughout a majority of the interior space 111 of reactor building 110. The closed flow loop 141 and its piping network 144 may have any suitable configuration designed to circulate CCW to, in fluidic order, CCW heat exchanger 148, the plurality of CCW auxiliary fluidic components 143, fuel pool heat exchanger 128, and then back to CCW heat exchanger 148. CCW pump 141 which provides the motive force for circulating the CCW may be located at any suitable position within the CCW closed flow loop 141.

The CCW piping network 144 is comprised of metallic piping 145 which includes bare piping sections 146 configured to radiate heat from the heated CCW to the interior space 111 of reactor building 110 for space heating purposes. In some embodiments, all of the piping network 144 may be comprised of bare piping sections 146 (i.e. no piping insulation) to maximize space heating and in turn concomitantly reduce or eliminate the need to combust fossil fuels such as oil or natural gas as some non-limiting examples for space heating purposes.

Figure 3:
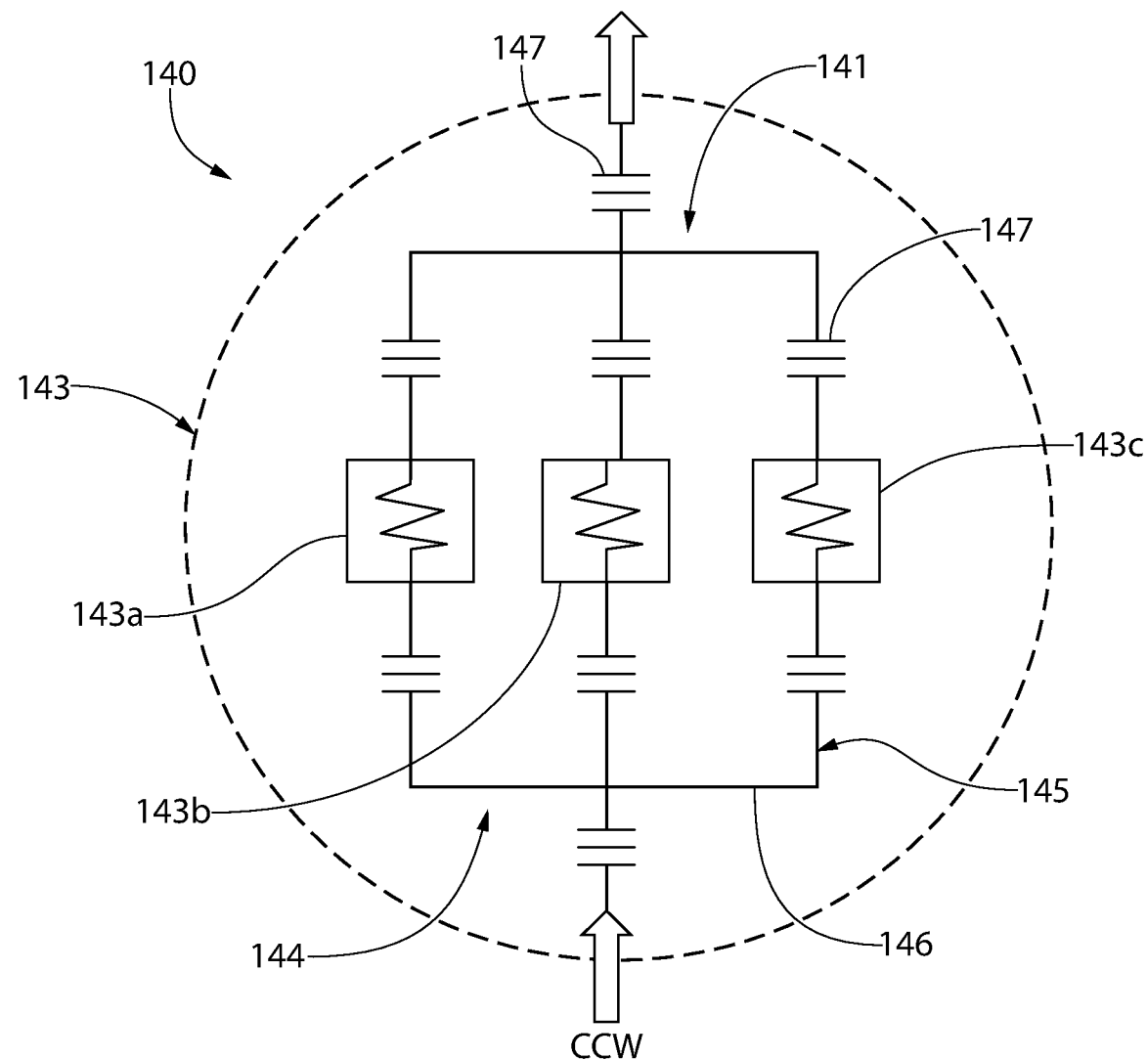
FIG. 3 is a schematic flow diagram showing details of the component cooling water (CCW) components and branched piping network shown in FIG. 1.

In some embodiments, at least some portions of the CCW bare piping sections 146 in CCW closed flow loop 141 may includes radially protruding fins 147 to optimize transfer of heat from the heated CCW to the interior space 111 of reactor building 110 (see, e.g., FIG. 3). Any suitable configuration of fins may be used. Fins 147 may also be provided on bare piping sections 131 of the fuel pool cooling system piping network 129 for optimal space heating.

FIG. 3 is a schematic diagram representing the plurality of auxiliary fluidic equipment or components 143 which are cooled by the CCW system 140. Three auxiliary fluidic components 143a, 143b, and 143c are represented as an example for convenience of illustration only, recognizing that less or more commonly many more such components would be cooled by CCW. CCW is circulated through components 143a-c via the CCW closed flow loop 141. In practice in a typical nuclear generation plant, the CCW piping network 144 is configured with a labyrinth of multiple pipe branches which convey CCW to each of the auxiliary fluidic components 143 in need of cooling and which form integral parts of the closed flow loop 141. Cool CCW leaving CCW heat exchanger 148 is split and flows in multiple branches of CCW piping network 144 of the closed flow loop 141 to each auxiliary component to absorb heat therefrom and then exit the component in a heated condition. The multitude of heated CCW streams are collected and recombined upstream of the fuel pool heat exchanger 128 and then flow through the heat exchanger where the heated CCW absorbs thermal energy (heat) from the still hotter fuel pool water W circulating through the fuel pool heat exchanger within the fluidly isolated fuel pool closed flow loop 126.

In a nuclear plant, in general, the component cooling water (CCW) system 140 is a continuously circulating closed loop of purified water that serves to cool a variety of equipment in the plant. Among its important auxiliary roles in addition to those noted above (e.g., fuel pool 121 cooling and auxiliary fluidic components 143 cooling) is extracting the decay heat from the reactor water after the reactor is shutdown, which is typically performed inside a tubular heat exchanger known variously as the "decay heat cooler" or "residual heat removal heat exchanger" (not shown). The heat transferred to the CCW in the decay heat cooler and other heat exchangers that are used to cool electrical and mechanical machinery occurs across the walls of tubes which sequesters or isolates the CCW from the radioactive contamination that may be associated with the reactor water. Thus, the component cooling system essentially serves to provide the means to remove waste heat from all equipment in the plant that requires cooling as well as to serve as a barrier against release of radiation to the environment.

The heat collected by the CCW from plant equipment, however, raises its temperature. The heated CCW is typically cooled in a once-through flow system by rejecting its heat to the environment in shell-and-tube CCW heat exchanger 148 using a natural body of water such a lake, river, or the sea when available as noted above. As further described herein, the raw water cooling system 160 draws cool raw water from the natural body of water, which is pumped through the CCW heat exchanger and then returns the now heated raw water back to the natural body of water. In a conventional system, the decay heat thermally pollutes the natural body of water rather than efficiently utilizing this lost thermal energy instead for space heating according to the present disclosure to offset the need to burn fossil fuels for heating the reactor building during cold months.

The nuclear fuel decay heat utilization system 100 further includes an automated control system comprising programmable controller 200. Controller 200 is configurable via programming with appropriate control logic or operating instructions (e.g., software) to control the flowrate of raw water RW through the raw water cooling system 160 and in turn maintain a desired room temperature within interior space 111 of the reactor building 110 by maximizing the temperature of the fuel pool water W and CCW flow streams circulating through the building to permissible limits. This maximizes the amount of heat radiated from the fuel pool and CCW piping networks 129, 144 to the building interior space for space heating needs during colder months.

In order to accomplish the above functionality, controller 200 which forms an integral part of the control system is operably and communicably coupled to a plurality of air and water sensors via communication links 203 (only some of which are number in FIG. 1 for convenience of illustration). The sensors includes at least one air temperature sensor 202 configured and located to measure the real-time air temperature within interior space 111 of reactor building 110. The controller 200 compares the real-time air temperature measured against a preprogrammed building setpoint air temperature in order to regulate the flow of raw water RW through the decay heat utilization system to control the reactor building air temperature. In some embodiments, multiple air sensors may be provided to measure to the temperature at different locations within the building depending on its size. Controller 200 may determine an average building temperature in order to regulate the raw water flowrate via throttling flow through throttle valve 206, or may use the lowest measured temperature to ensure all areas within the building meet a predetermined and preprogrammed building setpoint air temperature at a minimum.

The control system further includes at least one fuel pool temperature sensor 205 operably coupled to the controller 200 and configured to measure a real-time temperature of the fuel pool water W. The controller is configured to regulate the flowrate of raw water RW via throttling the throttle valve 206 to keep the pool water temperature below a preprogrammed maximum pool water setpoint temperature. The maximum pool water setpoint temperature may be based on the maximum temperature permitted by governmental nuclear regulatory agencies such as the USNRC, and temperatures at which the reinforced concrete pool walls and floor which contain the pool water W will deteriorate over time. Reinforced concrete generally will age and deteriorate at temperatures above 150 degrees. In one embodiment, without limitation, the flow of raw water through throttle valve 206 may be controlled to keep the pool water temperature below 150 degrees F. (Fahrenheit) which may be used as the preprogrammed maximum pool water setpoint temperature. For short durations, however, the temperatures in some pools have been permitted by the USNRC for operation as high as 180 Degrees F. under abnormal conditions. Accordingly, the 150 degree setpoint temperature in this case is below the regulator maximum at least for short duration periods. Other suitable maximum pool water setpoint temperatures may be used in other situations and fuel pool installations as appropriate.

The pool water temperature sensor 205 is configured to measure at least the hot or heated temperature the fuel pool water W for comparison by controller 200 against the preprogrammed maximum pool water setpoint temperature. Temperature sensor 205 may therefore be located either inside and submerged in the pool water W of the fuel pool 121, and/or in the heated leg or section of the closed flow loop 126 between the fuel pool and pool water inlet 128a to fuel pool heat exchanger 128 which includes pump 127. Use of dual pool water temperature sensors either both in the pool, both in flow loop 126, or a combination thereof provides failsafe sensor redundancy. An additional pool water temperature sensor 205 may optionally be installed to measure the cold leg or section temperature of the closed flow loop 126 between pool water outlet 128b of heat exchanger 128 and fuel pool 121 which allows controller 200 to monitor the thermal efficiency and performance of the fuel pool heat exchanger 128. The controller can quickly identify and trigger an alarm to plant operators if there is a tube leak, excessive tube fouling, or other conditions which adversely affect heat exchanger operation.

A plurality of additional water temperature sensors 204 (some of which are numbered in FIG. 1) may be provided to allow controller 200 to monitor the temperature of the CCW at different points in the CCW closed flow loop 141 and raw water flow loop 161 as shown. These water sensors 204 may be located so that all inlet and outlet water streams of both heat exchangers 128 and 148 may be monitored by controller 200 which allows the controller to monitor the thermal efficiency and performance of both heat exchangers. The controller can quickly identify and trigger an alarm to plant operators if there is a tube leak, excessive tube fouling, or other conditions which adversely affect operation of both heat exchangers.

To control the flowrate of raw water RW through the decay heat utilization system 100 for space heating interior space 111 of reactor building 110, controller 200 is further operably coupled to raw water throttle valve 206. The control system is configured via programming controller 200 such that as the throttle valve decreases the flowrate of the raw water extracted from the external heat sink 104, the real-time air temperature inside the building increases, and vice-versa. By comparing the real-time air temperature measured inside interior space 111 of reactor building 110 via air temperature sensor(s) 202, the position of the throttle valve (i.e. percent opened or closed between fully open and fully closed) is adjusted by the controller to maintain the preprogrammed building setpoint air temperature as previously described herein.

By also monitoring the heated fuel pool water W temperature as previously described herein, the controller 200 can further ensure that the preprogrammed maximum pool water setpoint temperature is not exceeded even if maintaining the air temperature inside reactor building 110 suffers to ensure safety of the nuclear plant. Accordingly, in certain embodiments, the controller may preferably be configured to prioritize maintaining the fuel pool water temperature W below the maximum pool water setpoint temperature over maintaining the building setpoint air temperature as a plant operational safety measure.

The control system may further include a flow meter 201 configured to measure the flowrate of the cold raw water circulating in the raw water flow loop 161. The flow meter is operably coupled to the controller 200 which monitors a change in the flowrate of raw water input into the decay heat utilization system 100 when the throttle valve 206 is throttled between a fully open position and a fully closed position to regulate the temperature of the CCW in closed flow loop 141, and in turn fuel pool closed flow loop 126 and the fuel pool 121 in turn.

Controller 200 may further be operably coupled to some or all of fuel pool water pumps 127, CCW pump 42, and raw water 162 shown in FIG. 1 to control operation of those pumps. In some embodiments, the controller may be operably coupled to at least raw water pump 162 to start or stop the flow of raw water through CCW heat exchanger 148 altogether. In extremely cold weather, the heat lost through radiation to the interior space 111 of building 110 via closed flow loops 126, 141 during such cold periods may be sufficient to cool both the CCW and pool water W sufficiently to allow the controller to completely stop flow of raw water into the system.

Figure 5:
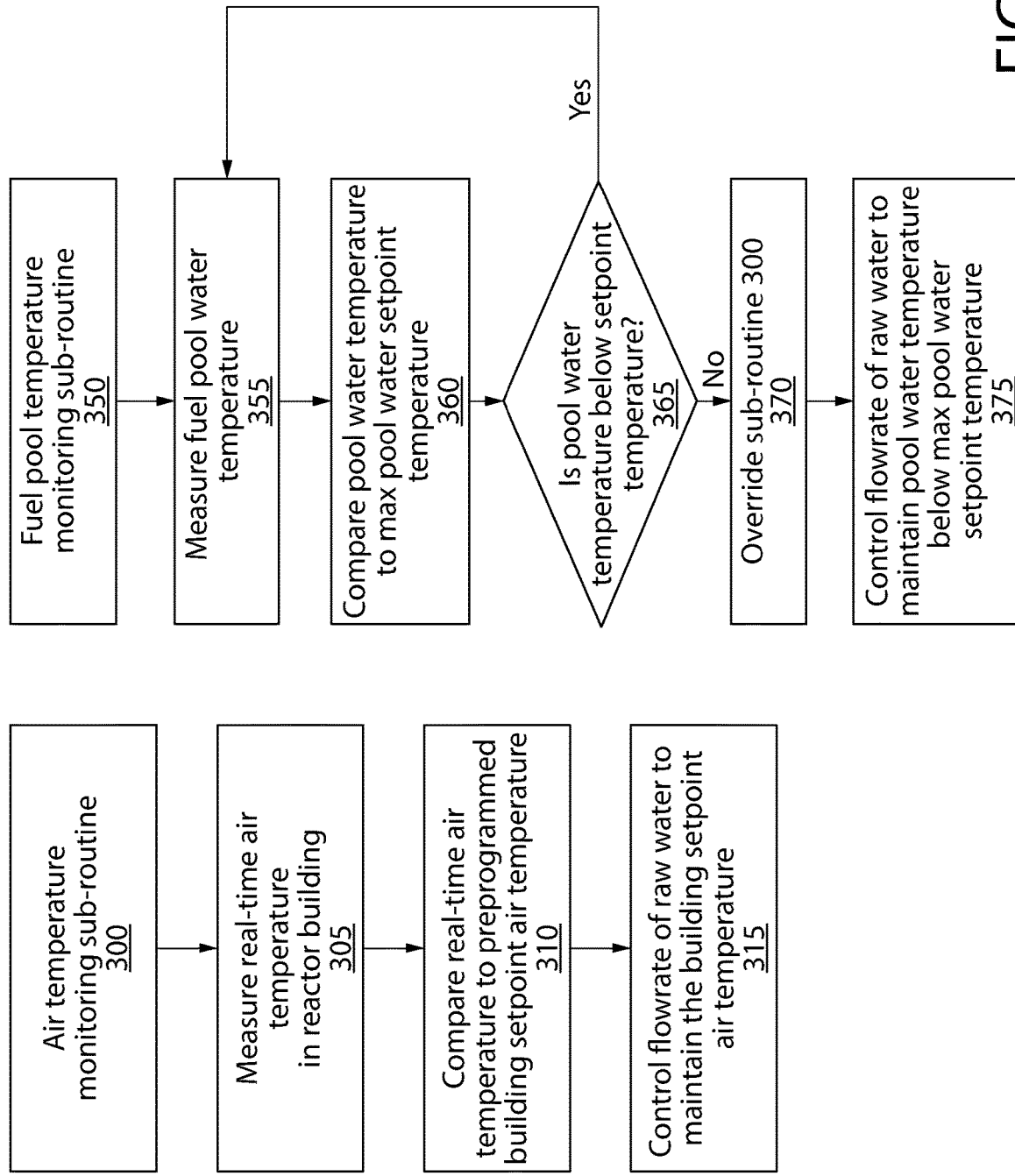
FIG. 5 is a high-level control logic flowchart implemented by the programmable controller shown in FIG. 1 which controls the decay heat utilization heating system.

FIG. 5 is a high level logic flow chart summarizing the general steps involved in the method or process 300 previously described herein which is executed and implemented by programmable controller 200. During the method/process, the controller 200 implements two separate sub-routines in parallel including (1) an air temperature monitoring sub-routine 300 to maintain a heated environment and air temperature in interior space 111 of reactor building 110, and (2) a fuel pool temperature monitoring sub-routine 350 to maintain the maximum fuel pool water W temperature below the preprogrammed and predetermined maximum pool water setpoint temperature for safe operation of the fuel pool 121. Accordingly, as noted above and summarized in controller sub-routine 350 below, the controller prioritizes sub-routine 350 over sub-routine 300.

Referring first to building air temperature monitoring sub-routine 300 programmed into controller 200 shown in FIG. 5, the controller based on sensor input described above implements this sub-routine which includes steps to: Measure the real-time air temperature in reactor building 110 (Step 305); Compare the real-time air temperature to preprogrammed building setpoint air temperature (Step 310); and Control the flowrate of raw water RW input into the decay heat utilization system 100 to maintain the building setpoint air temperature (Step 315). The controller achieves this control by throttling the flowrate of raw water through throttle valve 206 (shown in FIG. 1) by adjusting the position of the valve between fully open and closed as previously described herein.

Referring next to fuel pool temperature monitoring sub-routine 350 programmed into controller 200 shown in FIG. 5, the controller based on sensor input described above implements this sub-routine which includes steps to: Measure the fuel pool water W temperature (Step 355); Compare the pool water W temperature to the preprogrammed maximum pool water setpoint temperature (Step 360); Determine if the pool water temperature is below the maximum pool water setpoint temperature (Step 365); Override the building air temperature sub-routine 300 in Step 370 if the pool water temperature is not below the maximum pool water setpoint temperature (i.e. a "No" response in decision Step 365); and Control flowrate of raw water to maintain pool water temperature below max. pool water setpoint temperature (Step 375). The reactor building air temperature in this case will not again control the operating scheme until the fuel pool temperature drops to safe levels below the pool water setpoint temperature.

If however the pool water temperature is determined to be below the preprogrammed maximum setpoint temperature in decision Step 365 above (i.e. a "Yes" response), control does not pass to override Step 370. Instead, control in sub-routine 350 passes back to step 355 and the controller 200 continues measuring and monitoring the fuel pool water temperature via the control loop shown. In this case, the building air temperature monitoring sub-routine 300 continues its operation uninterrupted to maintain the reactor building 110 air temperature at the predetermined and preprogrammed building setpoint air temperature.

Any suitable commercially-available programmable controller may be used and configured via control logic or instructions (i.e. software) to achieve the functionality described herein. Such a commercial controller standardly includes all the necessary electronic appurtenances to form a fully functional automated control system such as for example without limitation suitable non-transitory computer-readable medium including volatile and non-volatile memory, input/output devices and user interface to permit programming the controller, communication interface configured to permit wired and/or wireless exchange of data and signals with the sensors, flowmeter, throttle valve, etc. previously described herein, power supply, and other packaged controller-related devices. It is well within the ambit of those skilled in the art to appropriately program the controller accordingly.

A method or process for space heating a building using nuclear fuel decay heat will now be briefly summarized based on the description of the decay heat utilization system 100 described herein which implements the method/process. FIG. 5 is a high level logic flow chart of the general steps involved in the method or process. General reference to made to FIGS. 1-4 as appropriate.

The method or process generally includes submerging a plurality of fuel assemblies 124 containing nuclear fuel 124a in fuel pool 121 containing pool water W below water surface S. As previously described herein, the fuel assemblies are stored in the upwardly open cells 125 of a plurality of fuel racks 122 seated on the floor slab 121b of the fuel pool. The decay heat emitted from the fuel assemblies next heats the fuel pool W. Next, the method continues with extracting and circulating the heated pool water through the fuel pool closed flow loop 126 (e.g., a first closed flow loop) via fuel pool water pump 127. Next, heat is transferred from the heated pool water W to the CCW (component cooling water) closed flow loop 141 (e.g., a second closed flow loop) which heats CCW circulating therein. The thermal energy or heat from the heated pool water is transferred to CCW via fuel pool heat exchanger 128 as previously described herein. To heat the interior space 111 of reactor building 110, the process continues with radiating heat from the CCW closed flow loop to the interior space such as from the bare sections 146 of the CCW piping network 144 as previously described herein.

The method may further comprise circulating the heated CCW through the CCW closed flow loop 141, and transferring heat from the heated CCW to the raw water flow loop (e.g., a third flow loop) which heats the raw water circulating therein. The thermal energy or heat from the heated CCW is transferred to raw water via CCW heat exchanger 148 as previously described herein. The method may further comprise flowing the heated raw water to the external heat sink 104 located outside the building 110, and transferring heat from the heated raw water to cooler raw water in the heat sink which dissipates thermal energy from the heated raw water to the ambient environment.

Decommissioning Nuclear Plant Contaminated Water

According to another aspect of the invention, the nuclear fuel decay heat utilization system 100 disclosed herein with ability to throttle or stop the flowrate of raw water RW into the system may be used to boil off residual contaminated (i.e. radioactive) waste water remaining at a shutdown nuclear generation plant undergoing decommissioning and dismantling. For example, in one test case at a plant undergoing decommissioning, approximately 750,000 gallons of residual contaminated (i.e. radioactive) water was evaporated using the fuel pool's waste decay heat. Otherwise, the radioactive water would likely have to be discharged into an available body of water such as a lake or the ocean gradually over time, which environmental activists oppose. The NRC does allows the discharge within a certain activity limit.

Throttling or stopping the intake and flowrate of raw water into the plant to increase the fuel pool water temperature using the decay heat utilization system 100 according to the present disclosure may be used to evaporate the remaining inventory of contaminated (i.e. radioactive) fuel pool water W alone and/or other sources of contaminated water inventory that every operating plant must have to provide radiation shielding to the various fissile and activated metals stored throughout the plant. The other sources of contaminated water may be conveyed via piping or physical hauling via tank trucks to the fuel pool for evaporation. All of this contaminated water must be dispensed with when the plant is placed in the permanent shutdown state.

A method for evaporating contaminated radioactive water at a decommissioned nuclear generation plant may generally comprises providing a nuclear generation plant comprising a building with an interior space including a fuel pool containing a plurality of submerged fuel assemblies which emit decay heat that heats pool water in the fuel pool; providing a decay heat utilization system which draws raw water from an external heat sink to cool the pool water through an intermediary cooling water system circulating cooling water which absorbs the decay heat from the pool water and transfers the decay heat to the raw water; stopping or throttling flow of raw water into the decay heat utilization system; increasing a temperature of the pool water in the fuel pool to a predetermined pool water temperature; and evaporating the pool water which reduces a volume of the pool water in the fuel pool.

The method may further comprise throttling the flow of raw water into the decay heat utilization system such that the pool water temperature remains in a range of temperatures which includes the predetermined pool water temperature. The predetermined pool water temperature may be at least 130 degrees Fahrenheit and less than 150 degrees Fahrenheit. In one embodiment, the predetermined pool water temp is 140 degrees Fahrenheit and the range of temperatures is 140 degrees to 149 degrees Fahrenheit. During implementation of the method, water vapor from the evaporating pool water enters the interior space within the building. The water vapor may then be passed through a charcoal air filter and discharged to ambient air outside the building.

In preferred but non-limiting embodiments, the waste heat utilization system includes the programmable controller 200 previously described herein which is programmed with the predetermined pool water temperature, the raw water throttle valve 206 operably coupled to the controller, and a water temperature sensor 205 operably coupled to the controller and configured to measure a real-time pool water temperature. Temperature sensor 205 may be immersed directly in the fuel pool 121 or located in the fuel pool cooling closed flow loop 126 for measuring the real-time pool water temperature.

During implementation of the method, the controller is configured to: monitor the real-time pool water temperature; compare the real-time pool water temp to the predetermined pool water temperature; and throttle the throttle valve to maintain the predetermined pool water temperature or a range of pool water temperatures which includes the predetermined pool water temperature. The predetermined pool water temperature and the range of pool water temperatures are preferably less than 150 degrees Fahrenheit.

Variations of the foregoing method may be used.

While the foregoing description and drawings represent examples of the present invention, it will be understood that various additions, modifications and substitutions may be made therein without departing from the spirit and scope and range of equivalents of the accompanying claims. In particular, it will be clear to those skilled in the art that the present invention may be embodied in other forms, structures, arrangements, proportions, sizes, and with other elements, materials, and components, without departing from the spirit or essential characteristics thereof. In addition, numerous variations in the methods/processes as applicable described herein may be made without departing from the spirit of the invention. One skilled in the art will further appreciate that the invention may be used with many modifications of structure, arrangement, proportions, sizes, materials, and components and otherwise, used in the practice of the invention, which are particularly adapted to specific environments and operative requirements without departing from the principles of the present invention. The presently disclosed examples are therefore to be considered in all respects as illustrative and not restrictive, the scope of the invention being defined by the appended claims and equivalents thereof, and not limited to the foregoing description or examples. Rather, the appended claims should be construed broadly, to include other variants of the invention, which may be made by those skilled in the art without departing from the scope and range of equivalents of the invention.

What is claimed is:

1. A nuclear fuel decay heat utilization system for space heating comprising:
   a building;
   a fuel pool disposed in the building, the fuel pool containing pool water and a plurality of nuclear fuel assemblies submerged in the pool water which emit decay heat that heats the pool water;

a first cooling system disposed in the building and comprising a first closed flow loop fluidly coupled to the fuel pool,
  the first cooling system comprising a first heat exchanger fluidly disposed in the first closed flow loop,
  the first cooling system configured to circulate the pool water through the first closed flow loop and a first heat exchanger;
a second cooling system disposed in the building and comprising a second closed flow loop thermally coupled to the first closed flow loop through the first heat exchanger,
  the second cooling system comprising a second heat exchanger fluidly disposed in the second closed flow loop,
  the fuel second cooling system configured to
    circulate cooling water through the second closed flow loop and the second heat exchanger, and also
    circulate the cooling water through the first heat exchanger in which the cooling water absorbs heat from the heated pool water which cools the heated pool water and heats the cooling water;
a third cooling system comprising
  an external heat sink located outside the building
  and a third flow loop thermally coupled to the second closed flow loop through the second heat exchanger,
  the third cooling system configured to circulate raw water from the heat sink through the second heat exchanger in which the raw water absorbs heat from the cooling water in the second closed flow loop which cools the cooling water and heats the raw water;
  the third cooling system further configured to circulate the heated raw water back to the external heat sink which can transfer heat absorbed from the raw water to an ambient environment;
an air temperature sensor disposed in the building and configured to measure a real-time air temperature inside the building;
a throttle valve fluidly interposed between the external heat sink and the second heat exchanger in the third flow loop,
  the throttle valve configured to regulate a flowrate of the raw circulated through third flow loop from the heat sink and the second heat exchanger;
a programmable controller operably coupled to the throttle valve and the air temperature sensor; the controller configured to:
  monitor the real-time air temperature inside the building;
  compare the real-time air temperature to a preprogrammed building setpoint air temperature; and
  control the flowrate of the raw water to maintain the building setpoint air temperature.

2. The system according to claim 1, wherein the first and second closed flow loops each comprise a piping network extending throughout the building, the piping networks including at least some bare piping sections operable to radiate heat from the heated pool water and cooling water flowing in the first and second closed flow loops respectively which heats ambient air inside the building.

3. The system according to claim 2, wherein portions of the bare piping sections in the second closed flow loop comprise external fins configured to radiate heat to the ambient air inside the building for space heating.

4. The system according to claim 1, further comprising a fuel pool temperature sensor operably coupled to the controller and configured to measure a real-time pool water temperature,
  the controller configured to regulate the flowrate of raw water in the third flow loop via throttling the throttle valve to keep the pool water temperature below a preprogrammed maximum pool water setpoint temperature.

5. The system according to claim 4, wherein the maximum pool water setpoint temperature is 150 degrees F.

6. The system according to claim 4, wherein the controller is configured to prioritize maintaining the fuel pool temperature below the maximum pool water setpoint temperature over maintaining the building setpoint air temperature.

7. The system according to claim 1, wherein the system is configured such that as the throttle valve decreases the flowrate of the third liquid coolant extracted from the external heat sink, the real-time air temperature inside the building increases.

8. The system according to claim 1, wherein the external heat sink is selected from the group consisting of a river, a lake, a cooling pond, and a sea.

9. The system according to claim 1, wherein the external heat sink is selected from the group consisting of a natural draft cooling tower, a mechanical draft cooling tower, and an air-cooled condenser.

10. The system according to claim 1, wherein the third flow loop is a closed flow loop which recirculates the raw water from and to the external heat sink,
  the external heat sink operable to received heated raw water discharged by the second heat exchanger, and return cooled raw water to the second heat exchanger.

11. The system according to claim 1, wherein the first closed flow loop and second closed flow loops are fluidly isolated from each other, and the second closed flow loop and third flow loop are fluidly isolated from each other.

12. The system according to claim 1, wherein the second cooling system is a component cooling water system, the second heat exchanger is a component cooling water heat exchanger, and the cooling water in the second cooling system is component cooling water which circulates through a plurality of auxiliary components fluidly disposed within the second closed flow loop and housed within the building.

13. The system according to claim 12, wherein the component cooling water extracts heat from the auxiliary components which heats the component cooling water.

14. The system according to claim 13, wherein the component cooling water leaving the second heat exchanger has a lower temperature than the component cooling water entering the first heat exchanger, and
  the component cooling water has a higher temperature leaving the first heat exchanger than the component cooling water entering the first heat exchanger.

15. The system according to claim 14, wherein the component cooling water has a higher temperature entering the second heat exchanger than the component cooling water leaving the second heat exchanger.

16. The system according to claim 1, wherein the fuel assemblies are disposed in a plurality of fuel racks seated on a floor of the fuel pool and submerged in the pool water.

17. The system according to claim 1, wherein a maximum temperature of the pool water circulating through the first closed flow loop is higher than a maximum temperature of the cooling water circulating through the second closed flow loop, and the maximum temperature of the cooling water circulating through the second closed flow loop is higher than a maximum temperature of the raw water circulating through the third flow loop.

18. The system according to claim 1, further comprising a flow meter configured to measure the flowrate of the raw water circulating in the third flow loop, the flow meter operably coupled to the controller which monitors a change in the flowrate when the throttle valve is throttled between a fully open position and a fully closed position.

19. The system according to claim 1, wherein the first heat exchanger is a spent fuel pool cooler and the second heat exchanger is a component cooling water heat exchanger.

20. The system according to claim 1, wherein each of the first closed flow loop, second closed flow loop, and third flow loop include a water circulation pump which circulates the pool water, cooling water, and raw water respectively therethrough.

* * * * *